(12) United States Patent
Gruber

(10) Patent No.: US 10,226,839 B2
(45) Date of Patent: Mar. 12, 2019

(54) BUTT JOINTED CLOSED SECTION HOLLOW STRUCTURAL ELEMENT

(71) Applicant: Rudolf Gruber, Uxbridge (CA)

(72) Inventor: Rudolf Gruber, Uxbridge (CA)

(73) Assignee: Multimatic Inc., Markham (CA)

( * ) Notice: Subject to any disclaimer, the term of this patent is extended or adjusted under 35 U.S.C. 154(b) by 419 days.

(21) Appl. No.: 14/866,810

(22) Filed: Sep. 25, 2015

(65) Prior Publication Data

US 2016/0016260 A1 Jan. 21, 2016
US 2018/0297149 A9 Oct. 18, 2018

Related U.S. Application Data

(60) Division of application No. 13/525,337, filed on Jun. 17, 2012, which is a continuation of application No. PCT/IB2010/055898, filed on Dec. 16, 2010.

(60) Provisional application No. 61/287,662, filed on Dec. 17, 2009.

(51) Int. Cl.
| | |
|---|---|
| *B62D 21/11* | (2006.01) |
| *B23K 26/28* | (2014.01) |
| *B23K 26/38* | (2014.01) |
| *B23K 101/00* | (2006.01) |
| *B23K 101/04* | (2006.01) |

(52) U.S. Cl.
CPC ............. *B23K 26/28* (2013.01); *B23K 26/38* (2013.01); *B62D 21/11* (2013.01); *B23K 2101/006* (2018.08); *B23K 2101/045* (2018.08); *Y10T 29/49893* (2015.01); *Y10T 428/12354* (2015.01)

(58) Field of Classification Search
CPC ........ Y10T 29/49893; Y10T 428/1235; B23K 26/28; B23K 26/38; B23K 2201/045; B23K 2201/006; B62D 21/11
See application file for complete search history.

(56) References Cited

U.S. PATENT DOCUMENTS

| | | |
|---|---|---|
| 2,189,719 A | 2/1940 | Wallace |
| 2,314,603 A | 3/1943 | Sorensen et al. |
| 2,685,479 A | 8/1954 | Buckendale |
| 2,825,431 A | 3/1958 | Mold |
| 3,559,278 A | 2/1971 | Brandberg |
| 4,400,860 A | 8/1983 | Nonnenmann et al. |

(Continued)

FOREIGN PATENT DOCUMENTS

| | | | |
|---|---|---|---|
| EP | 0326994 | 8/1989 | |
| EP | 0326994 A1 * | 8/1989 | ............. B23K 26/24 |

(Continued)

*Primary Examiner* — Sarang Afzali
*Assistant Examiner* — Ruth G Hidalgo-Hernandez
(74) *Attorney, Agent, or Firm* — Carlson, Gaskey & Olds, P.C.

(57) ABSTRACT

A method is provided which forms a closed section hollow structural element by performing the following steps which include press forming an upper sheet metal component configured with two primary parallel downstanding interface flanges; press forming a lower sheet metal component configured with two primary parallel upstanding interface flanges; complementarily trimming the downstanding interface flanges and the upstanding interface flanges using five-axis laser cutting; and butt welding the interface flanges of the upper and lower sheet metal components to one another to form a continuous hollow structural element of variable cross section.

7 Claims, 4 Drawing Sheets

(56) References Cited

U.S. PATENT DOCUMENTS

| | | | |
|---|---|---|---|
| 4,902,872 | A | 2/1990 | Frings et al. |
| 6,098,262 | A | 8/2000 | Thoms et al. |
| 6,105,845 | A | 8/2000 | Aebersold et al. |
| 7,726,027 | B2 | 6/2010 | Fuks et al. |
| 2007/0296174 | A1 | 12/2007 | Chan et al. |
| 2009/0305075 | A1 | 12/2009 | Flehming et al. |
| 2013/0140868 | A1 | 6/2013 | Muck et al. |

FOREIGN PATENT DOCUMENTS

| | | |
|---|---|---|
| GB | 830366 A | 3/1960 |
| GB | 2190586 | 11/1987 |
| KR | 20020064122 | 8/2002 |

\* cited by examiner

BUTT JOINTED CLOSED SECTION HOLLOW STRUCTURAL ELEMENT

CROSS REFERENCE TO RELATED APPLICATIONS

This patent application is a divisional of U.S. patent application Ser. No. 13/525,337 filed Jun. 17, 2012, which is a continuation of PCT Application No. PCT/IB2010/055898 filed Dec. 16, 2010, which claims priority to U.S. Provisional Patent Application No. 61/287,662 filed Dec. 17, 2009.

BACKGROUND

It would be advantageous to create a vehicular structural member such as a motor compartment rail, suspension control arm or suspension subframe beam from a closed section hollow element that utilizes a conventional clamshell configuration but eliminates the overlapped joint of the prior art. It has been proven that for large volume applications such as those dictated by the automotive industry. Sheet metal press forming is the most cost-effective method of manufacturing structural components. Almost every vehicle currently produced utilizes a body structure and selected subframes constructed almost entirely from either aluminum or steel stampings manufactured using press forming techniques. Wherever closed section hollow elements are required they are generally constructed from two press formed open section sheet metal components, creating a clamshell configuration using either an overlapping section to facilitate a suitable fillet type weld joint or an outstanding flange to provide a double material spot weld joint. The primary aim of the present disclosure is to eliminate the redundant material associated with overlapping or flange type joints in clamshell closed section hollow elements.

The most efficient type of weld joint is a butt arrangement where the two components being structurally joined meet along a tangent interface at their open edges so that there is no overlapping of material. This butt joint can then be welded using MIG, TIG, Arc, Laser or similar means creating a continuous structural attachment of the two components. The quality of this welded butt joint is extremely sensitive to the gap between the two components and the differential thickness of the materials of the two components. The differential thickness can be controlled by correct specification during the design process. The gap between the two components is dependent on manufacturing process capability. When the two components are constructed from stamped sheet metal using press formed techniques the open edges cannot be developed to interface with a zero gap due to limitations in the process. It is for this reason that press formed clamshell configurations use either an overlapping section to facilitate a suitable fillet type weld joint or an outstanding flange to provide a double material spot weld joint.

SUMMARY

The most effective process for continuous structural attachment of two metal components is laser welding as laser welding imparts significantly less heat than other welding techniques. Laser welding also generally does not require filler material and has significantly faster application speed. However, laser welding requires even tighter tolerances on butt joint gaps than other welding techniques and so is generally only applied to overlapping material configurations. A closed section hollow element constructed from two press formed open section sheet metal components configured as a clamshell with structural attachment created by laser welding of a butt joint at the interface between the components would offer a significant weight and cost advantage over the configurations of the prior art.

In an embodiment of the present disclosure, a closed section hollow element is constructed from an upper sheet metal stamped component with a generally open section manufactured using press forming techniques and configured with two primarily parallel downstanding interface flanges and a lower sheet metal stamped component with a generally open section manufactured using press forming techniques and configured with two primarily parallel upstanding interface flanges. After press forming, the upper sheet metal stamped component and lower sheet metal stamped component are rigidly held in dimensional compliance by a purpose built fixture and the upstanding and downstanding interface flanges are complementarily trimmed using five-axis laser cutting. The fixture facilitates movement of the upper sheet metal stamped component and lower sheet metal stamped component into contact with each other along their entire interface with a zero gap while continuing to rigidly hold the components in dimensional compliance. The upper sheet metal stamped component and lower sheet metal stamped component are then structurally attached along the zero gap interface by a continuous laser butt weld while being rigidly held in the fixture. Because the components are rigidly held in dimensional compliance and the five axes trimming operation is undertaken in the same fixture, the zero gap interface is absolutely maintained and a high quality laser welded joint with no redundant material overlap, very little heat effect and high processing speed is achieved. The result is a continuous hollow structural element of a variable cross section that has a high level of dimensional integrity because once the two sheet metal stamped components are structurally attached they hold each other in dimensional compliance once removed from the fixture thereby eliminating the effects of material springbuck and forming inaccuracies in the individual components.

In this manner, a highly efficient closed section hollow element is created that utilizes less material than structurally equivalent overlapped or flanged clamshell configurations thereby achieving a lower mass and lower cost solution. Additionally the closed section hollow element of the present disclosure can be constructed with cost effective press forming tools because highly accurate sheet metal stamped components are no longer required as the fixture provides the required dimensional tolerances during trimming and welding. An additional advantage of the closed section hollow element of the present disclosure is that its cross sectional area can be greatly varied along its length with far higher ratios than conventional closed section, non-overlapping joint arrangements produced by roll forming, blow forming or hydroforming.

DETAILED DESCRIPTION

Figure 1:
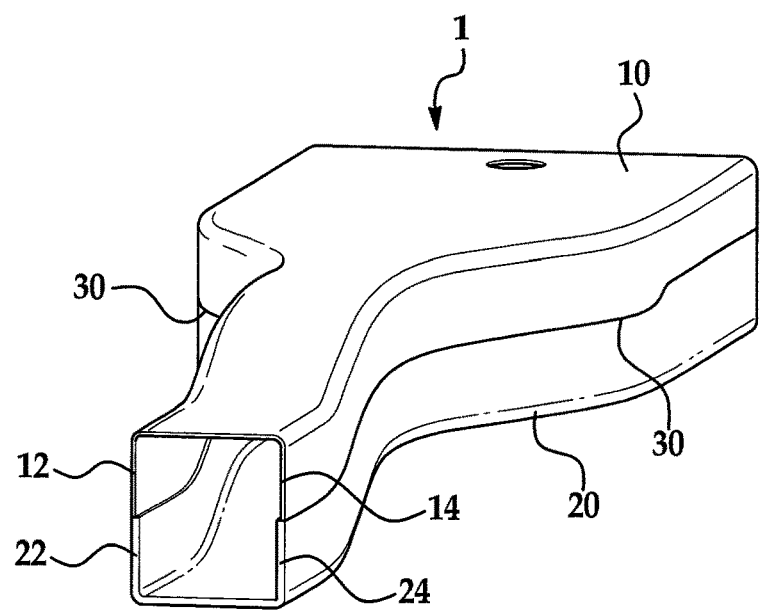
FIG. 1 is a perspective view of the inventive closed section hollow element.
Figure 2:
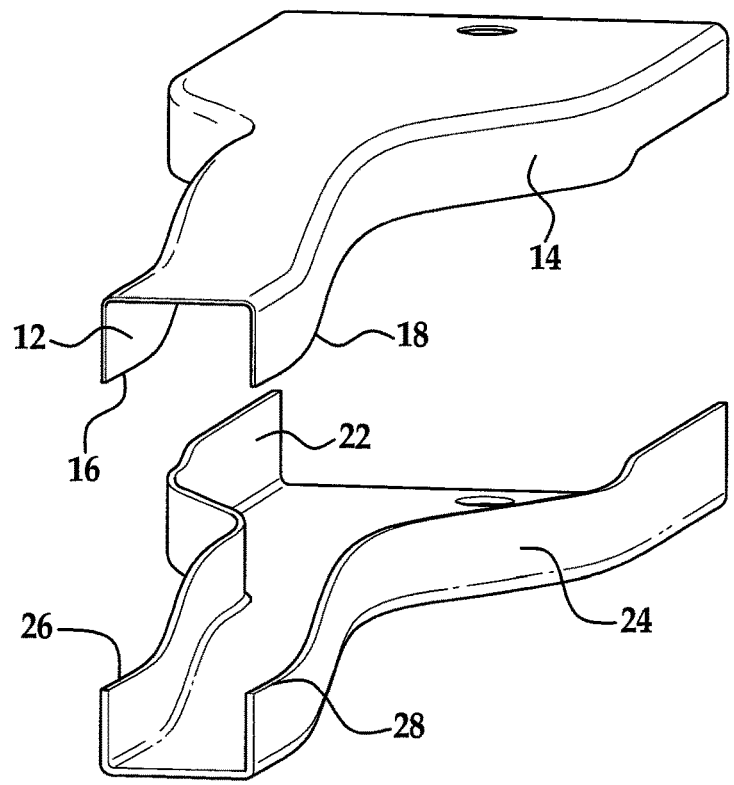
FIG. 2 is an expanded perspective view of the inventive closed section hollow element.

Referring to FIGS. 1 and 2, a closed section hollow element (1) is substantially constructed from an upper sheet metal stamped component (10) and a lower sheet metal stamped component (20). Both of the sheet metal stamped components are manufactured by press forming a flat sheet of steel, aluminum or other suitable metal or alloy into a required open section shape which is dictated by the final application's structural and packaging requirements. The upper sheet metal stamped component (10) is configured with two primarily parallel downstanding interface flanges (12)(14). As shown in the non-limiting example of FIGS. 1 and 2, the lower sheet metal stamped component (20) is configured with two primarily parallel upstanding interface flanges (22)(24). The downstanding interface flanges (12)(14) of the upper sheet metal component (10) are five-axes laser trimmed after press forming to create highly accurate interface edges (16)(18). The upstanding interface flanges (22)(24) of the lower sheet metal component (20) are five-axes laser trimmed after press forming to create highly accurate interface edges (26)(28). The interface edges (16)(18)(26)(28) are complementarily trimmed via a five-axes laser during a single operation while the upper sheet metal stamped component (10) and a lower sheet metal stamped component (20) are rigidly held in dimensional compliance by a purpose built fixture. In this manner the interface edges (26)(28) of the upstanding interface flanges (22)(24) and the interface edges (16)(18) of the downstanding interface flanges (12)(14) are configured to tightly match with a zero gap. This zero gap interface (also referred to as "interface") facilitates a high quality non-linear weld (30) that structurally attaches the upper sheet metal stamped component (10) and the lower sheet metal stamped component (20) so as to create a continuous hollow structural element (1) having a variable cross section.

Figure 3:
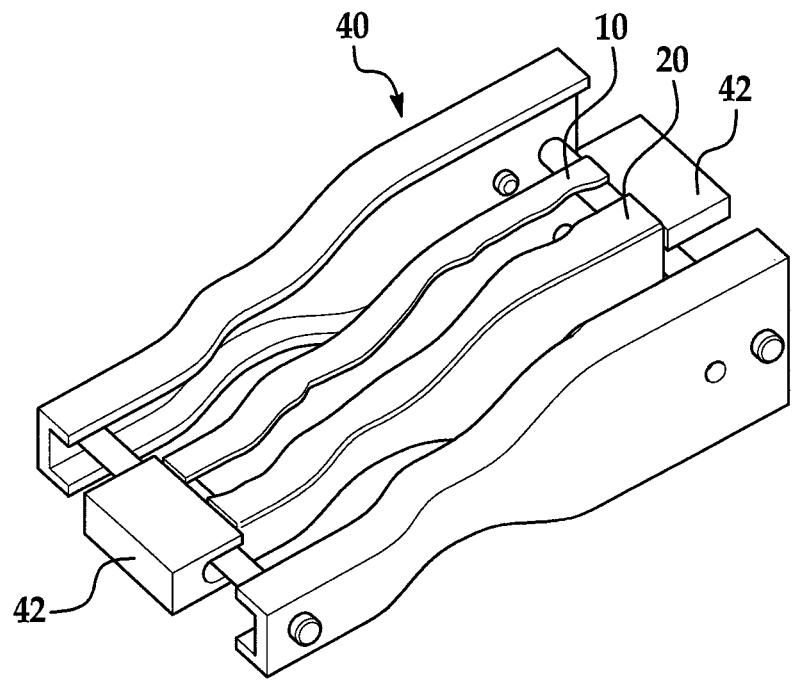
FIG. 3 is a perspective view of the components of the inventive closed section hollow element partially installed in the purpose built fixture.
Figure 4:
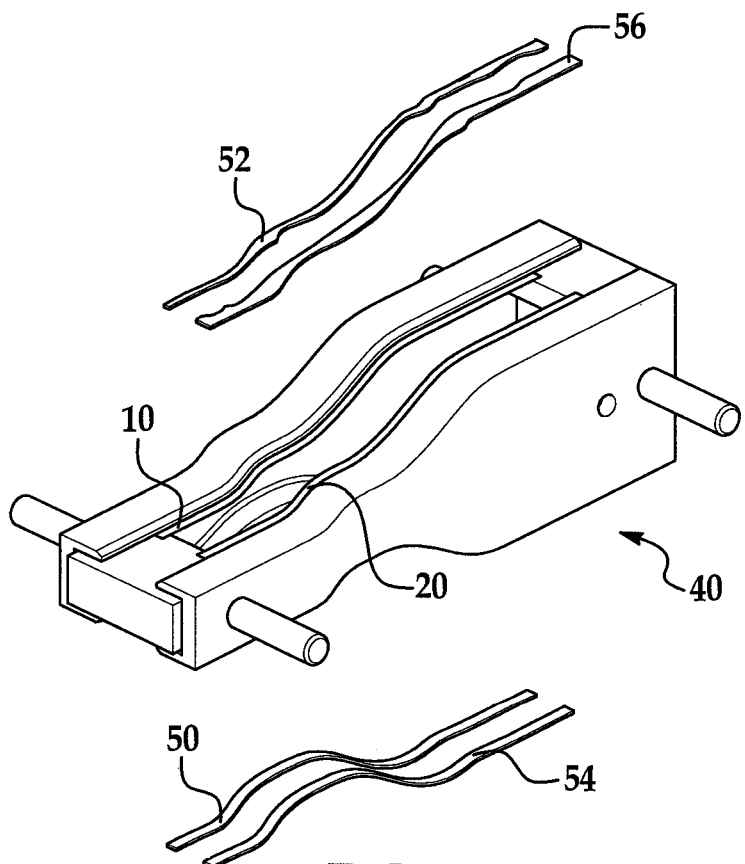
FIG. 4 is a perspective view of the purpose built fixture with the components of the inventive closed section hollow element fully installed and trimmed.

FIG. 3 illustrates a non-limiting example of a purpose built fixture (40) configured to rigidly hold the upper sheet metal stamped component (10) and lower sheet metal stamped component (20) with the sheet metal stamped components shown prior to installation in the purpose built fixture (40) held at a pre-determined distance by the spacer blocks (42). FIG. 4 illustrates the purpose built fixture (40) with the upper sheet metal stamped component (10) and lower sheet metal stamped component (20) fully installed in the fixture (40) and the interface edges (16)(18)(26)(28) having been complementarily trimmed via a five-axes laser. The scrap material (50)(52) that contains inaccurate formed edges (54)(56) is shown detached from the interface flanges (12)(14)(22)(24).

Figure 5:
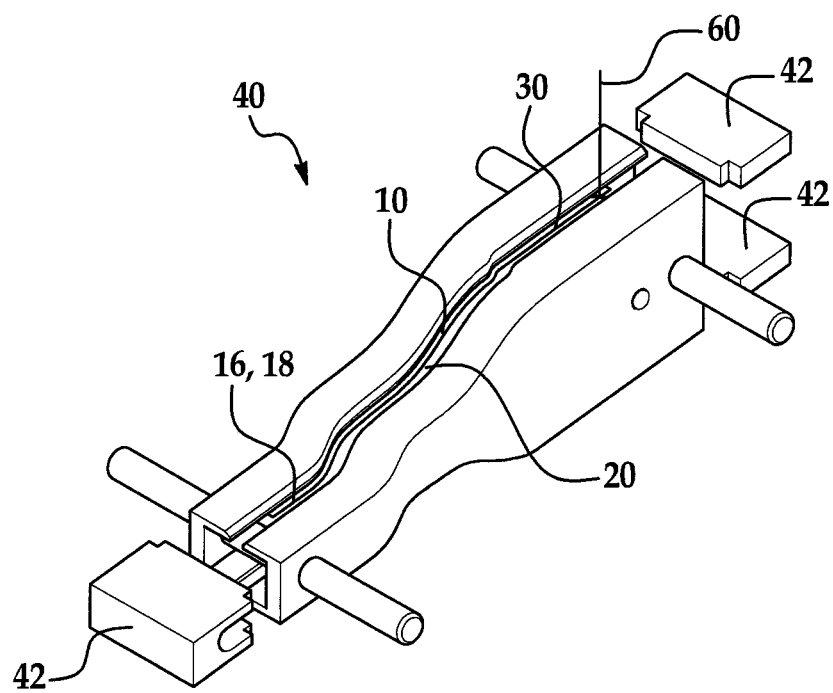
FIG. 5 is a perspective view of the purpose built fixture with the components of the inventive closed section hollow element fully installed during laser welding.

FIG. 5 illustrates the purpose built fixture (40) with the spacer blocks retracted (42) and the upper sheet metal stamped component (10) and lower sheet metal stamped component (20) brought into contact with each other along their previously laser trimmed interface edges (16)(18)(26)(28) creating a zero gap condition. A laser beam (60) is illustrated completing a welded butt joint (30) by butt welding along the entire zero gap interface so as to create a continuous hollow structural element (1) of a variable cross section.

Figure 6:
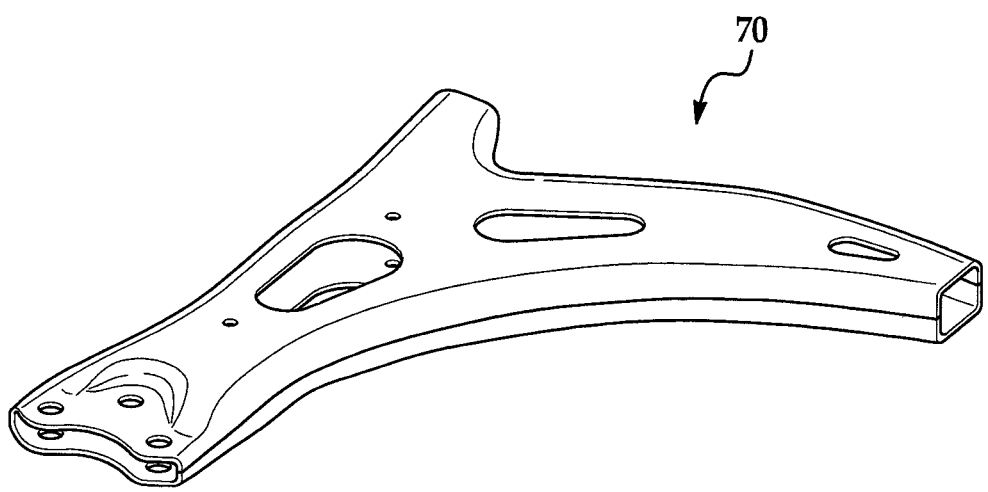
FIG. 6 is a perspective view of an application of the inventive closed section hollow element.

FIG. 6 illustrates a non-limiting example of a vehicular suspension arm (70) configured as a closed section hollow element of a variable cross section constructed using the manufacturing technique previously described.

Figure 7:
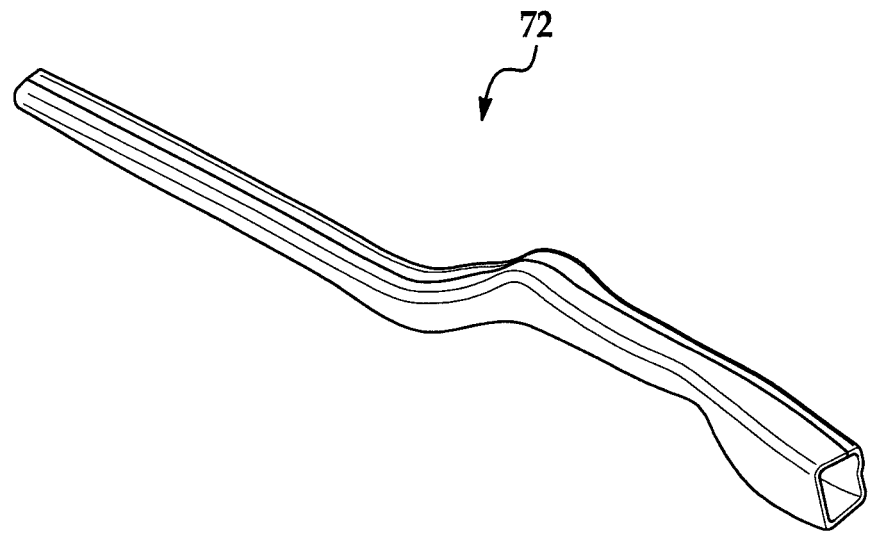
FIG. 7 is a perspective view of a further application of the inventive closed section hollow element.

FIG. 7 illustrates a non-limiting example of a vehicular motor compartment rail (72) configured as a closed section hollow element of a variable cross section constructed using the manufacturing technique previously described.

Figure 8:
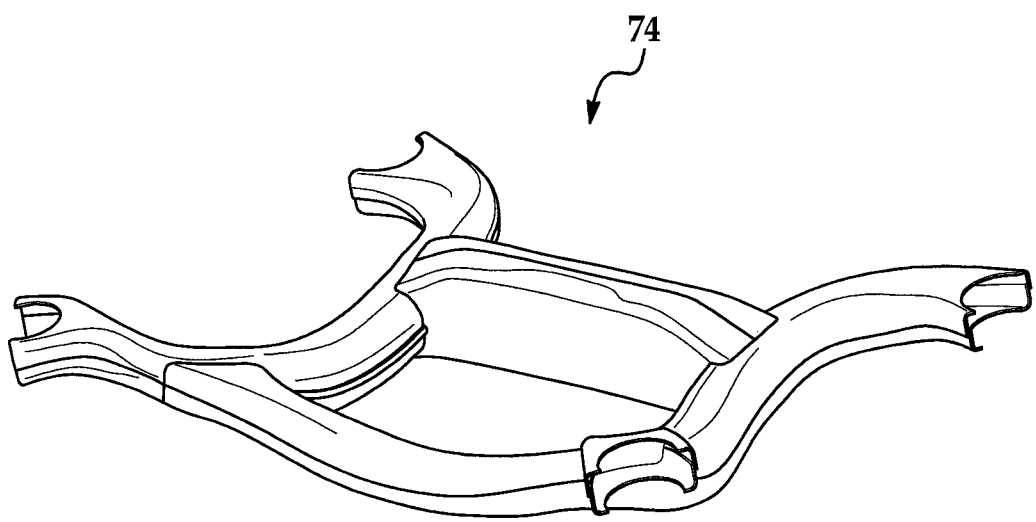
FIG. 8 is a perspective view of another application of the inventive closed section hollow element.

FIG. 8 illustrates a non-limiting example of a vehicular suspension subframe (74) configured from four closed section hollow elements of variable cross section constructed using the manufacturing technique previously described.

What is claimed is:

1. A method of forming a vehicular suspension subframe comprising:
    forming four closed section hollow structural elements of variable cross section, wherein the forming of each of the four closed section hollow structural elements comprises:
        press forming an upper sheet metal component with a generally open section and configured with two primary parallel downstanding interface flanges;
        press forming a lower sheet metal component with a generally open section and configured with two primary parallel upstanding interface flanges;
        complementarily trimming edges of the downstanding interface flanges and the upstanding interface flanges using five-axis laser cutting, while the upper and lower sheet metal components are held in a dimensional compliance in a fixture and in engagement with spacer blocks while maintaining the upper and lower sheet metal components at a predetermined distance during the complementarily trimming;
        removing the spacer blocks subsequent to performing the complementary trimming;
        butt welding the downstanding interface flanges and the upstanding interface flanges of the upper and lower sheet metal components to one another, while continuing to rigidly hold the upper and lower sheet metal components in the fixture, to form each of the four continuous closed section hollow structural elements of variable cross section; and
    securing the four closed section hollow elements of variable cross section with each other to create the vehicular suspension subframe.

2. The method of forming the vehicular suspension subframe as defined in claim 1, wherein the butt welding the downstanding interface flanges and the upstanding interface flanges of the upper and lower sheet metal components comprises a continuous laser butt weld.

3. The method of forming the vehicular suspension subframe as defined in claim 1, which further comprises subsequent to the removing of the spacer blanks, moving the upper sheet metal component and the lower sheet metal component into contact with each other while continuing to rigidly hold them in the fixture, and during the butt welding, structurally attaching the upper and lower metal sheet components along an interface by a butt weld.

4. A method of forming a continuous closed section hollow structural element of variable cross section comprising:

press forming an upper sheet metal component with a generally open section and configured with two primary parallel downstanding interface flanges;

press forming a lower sheet metal component with a generally open section and configured with two primary parallel upstanding interface flanges;

complementarily trimming edges of the downstanding interface flanges and the upstanding interface flanges using five-axis laser cutting, while the upper and lower sheet metal components are held in a dimensional compliance in a fixture and in engagement with spacer blocks and maintaining the upper and lower sheet metal components at a predetermined distance during the complementarily trimming;

removing the spacer blocks subsequent to performing the complementary trimming; and butt welding the downstanding interface flanges and the upstanding interface flanges of the upper and lower sheet metal components to one another, while maintaining the upper and lower sheet metal components in the fixture, to form the continuous closed section hollow structural element of variable cross section.

5. The method of forming the continuous closed section hollow structural element as defined in claim 4, wherein the upper and lower sheet metal members are clamped to one another by a first fixture member and a second fixture member of the fixture during the butt welding and with the spacer blocks removed.

6. The method of forming the continuous closed section hollow structural element as defined in claim 4, wherein the continuous closed section hollow structural element of variable cross section has a length, a width and a height, the length greater than the width and the height, wherein the butt welding creates a butt welding joint between the downstanding interface flanges and the upstanding interface flanges, and the butt welding joint extending along the length when the continuous closed section hollow structural element is formed.

7. A method of forming a closed section hollow structural vehicular suspension arm of variable cross section comprising:

press forming an upper sheet metal component with a generally open section and configured with two primary parallel downstanding interface flanges;

press forming a lower sheet metal component with a generally open section and configured with two primary parallel upstanding interface flanges;

complementarily trimming edges of the downstanding interface flanges and the upstanding interface flanges using five-axis laser cutting, while the upper and lower sheet metal components are held in a dimensional compliance in a fixture and in engagement with spacer blocks while maintaining the upper and lower sheet metal components at a predetermined distance during the complementarily trimming;

removing the spacer blocks subsequent to performing the complementary trimming; and butt welding the downstanding interface flanges and the upstanding interface flanges of the upper and lower sheet metal components to one another, while continuing to rigidly hold the upper and lower sheet metal components in the fixture, to form the continuous closed section hollow structural vehicular suspension arm of variable cross section.

* * * * *